(12) United States Patent
Sze et al.

(10) Patent No.: US 12,231,668 B2
(45) Date of Patent: *Feb. 18, 2025

(54) SIMPLIFIED BINARY ARITHMETIC CODING ENGINE

(71) Applicant: Texas Instruments Incorporated, Dallas, TX (US)

(72) Inventors: Vivienne Sze, Cambridge, MA (US); Madhukar Budagavi, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,037

(22) Filed: Jul. 31, 2023

(65) Prior Publication Data
US 2023/0379484 A1 Nov. 23, 2023

Related U.S. Application Data

(63) Continuation of application No. 17/137,465, filed on Dec. 30, 2020, now Pat. No. 11,722,682, which is a
(Continued)

(51) Int. Cl.
*H04N 19/436* (2014.01)
*H04N 19/13* (2014.01)

(52) U.S. Cl.
CPC ............ *H04N 19/436* (2014.11); *H04N 19/13* (2014.11)

(58) Field of Classification Search
CPC ...... H04N 19/436; H04N 19/13; H04N 19/40; H04N 19/70; H04N 19/37; H04N 19/186;
(Continued)

(56) References Cited

U.S. PATENT DOCUMENTS

2007/0242894 A1 10/2007 Kautzer et al.
2009/0168868 A1 7/2009 Jahanghir
(Continued)

OTHER PUBLICATIONS

Madhukar Budagavi et al., "Description of Video Coding Technology Proposal by Texas Instruments Inc.", JCTVC-A101, Apr. 15-23, 2010, pp. 1-45, Joint Collaborative Team on Video Coding (JCT-VC) of ITU-T SG16 WP3 and ISO/IEC JTC1/SC29/WG11, Dresden, Germany.
(Continued)

*Primary Examiner* — Joseph W Becker
(74) *Attorney, Agent, or Firm* — Carl G. Peterson; Frank D. Cimino

(57) ABSTRACT

A method of entropy coding in a video encoder is provided that includes assigning a first bin to a first single-probability bin encoder based on a probability state of the first bin, wherein the first single-probability bin encoder performs binary arithmetic coding based on a first fixed probability state, assigning a second bin to a second single-probability bin encoder based on a probability state of the second bin, wherein the second single-probability bin encoder performs binary arithmetic coding based on a second fixed probability state different from the first fixed probability state, and coding the first bin in the first single-probability bin encoder and the second bin in the second single-probability bin encoder in parallel, wherein the first single-probability bin encoder uses a first rLPS table for the first fixed probability state and the second single-probability bin encoder uses a second rLPS table for the second fixed probability state.

20 Claims, 9 Drawing Sheets

Related U.S. Application Data continuation of application No. 16/417,785, filed on May 21, 2019, now Pat. No. 10,911,764, which is a continuation of application No. 13/250,749, filed on Sep. 30, 2011, now Pat. No. 10,349,070.

(60) Provisional application No. 61/390,072, filed on Oct. 5, 2010, provisional application No. 61/388,523, filed on Sep. 30, 2010.

(58) Field of Classification Search
CPC ........... H04N 19/39; H04N 21/234363; H04N 13/00; H04N 21/23439; H04N 21/234381; H04N 21/2343; H04N 21/234309; H04N 21/234354; H04N 13/0048

See application file for complete search history.

(56) References Cited

U.S. PATENT DOCUMENTS

| | | |
|---|---|---|
| 2010/0007532 A1 | 1/2010 | Tanaka et al. |
| 2010/0097250 A1 | 4/2010 | Demircin et al. |
| 2011/0235712 A1 | 9/2011 | Lin et al. |

OTHER PUBLICATIONS

Martin Winken et al., "Description of Video Coding Technology Proposal by Fraunhofer HHI", JCTVC-A116, Apr. 15-23, 2010, pp. 1-44, Joint Collaborative Team on Video Coding (JCT-VC) of ITU-T SG16 WP3 and ISO/IEC JTC1/SC29/WG11, Dresden, Germany.

Madhukar Budagavi and Mehmet Umut Demircin, "Parallel Context Processing Techniques for High Coding Efficiency Entropy Coding in HEVC", JCTVC-B088, Jul. 21-28, 2010, pp. 1-11, Joint Collaborative Team on Video Coding (JCT-VC) of ITU-T SG16 WP3 and ISO/IEC JTC1/SC29/WG11, Geneva, Switzerland.

Vivienne Sze and Madhukar Budagavi, "High-Efficiency Entropy Coding Simplifications", JCTVC-C300, Oct. 7-14, 2010, pp. 1-8, Joint Collaborative Team on Video Coding (JCT-VC) of ITU-T SG16 WP3 and ISO/IEC JTC1/SC29/WG11, Guangzhou, China.

Thomas Wiegand et al., "WD1: Working Draft 1 of High-Efficiency Video Coding", JCTVC-C403, Oct. 7-15, 2010, pp. 1-137, Joint Collaborative Team on Video Coding (JCT-VC) of ITU-T SG16 WP3 and ISO/IEC JTC1/SC29/ WG11, Guangzhou, China.

Vivienne Sze and Madhukar Budagavi, "TE12: Evaluation of Entropy Coders: PIPE Tested Against CABAC", JCTVC-C058, Oct. 7-15, 2010, pp. 1-5, Joint Collaborative Team on Video Coding (JCT-VC) of ITU-T SG16 WP3 and ISO/IEC JTC1/SC29/WG11, Guangzhou, China.

Detlev Marpe et al., "Novel Entropy Coding Concept", JCTVC-A032, Apr. 15-23, 2010, pp. 1-17, Joint Collaborative Team on Video Coding (JCT-VC) of ITU-T SG16 WP3 and ISO/IEC JTC1/SC29/WG11, Dresden, Germany.

Detlev Marpe et al., "Probability Interval Partitioning Entropy Codes", submitted to IEEE Transactions on Information Theory, Jun. 2010, pp. 1-11.

Detlev Marpe et al., "Context-Based Adaptive Binary Arithmetic Coding in the H.264/AVC Video Compression Standard", IEEE Transactions on Circuits and Systems for Video Technology, vol. 13, No. 7, Jul. 2003, pp. 620-636.

"Encoder-Side Description of Test Model under Consideration", JCTVC-B204, Jul. 21-28, 2010, pp. 1-19, Joint Collaborative Team on Video Coding (JCT-VC) of ITU-T SG16 WP3 and ISO/IECJC1/SC29/WG11, Geneva, Switzerland.

"Advanced Video Coding for Generic Audiovisual Services", Series H: Audiovisual and Multimedia Systems, Infrastructure of Audio Visual Services—Coding of Moving Video, ITU-T Recommendation H.264, Telecommunication Standardization Sector of ITU, Mar. 2005, pp. 1-343.

Depra et al. A New Method for Significance Map Decoding Acceleration in the CABD Regular Hardware Engine; Very Large Scale Integration (VLSI-SoC), 2009 17th IFIP International Conference on Date of Conference: Oct. 12-14, 2009.

Wilken et al. Description of video coding technology proposal by Fraunhofer HHI, Joint Collaborative Team on Video Coding ( JCT-VC) of ITU-T SG16 WP3 and ISO/IEC JTC1/SC29/WG11, 1st Meeting: Dresden, DE, Apr. 15-23, 2010. (Year: 2010)—cited by Examiner in U.S. Appl. No. 16/417,785.

Marpe et al. Novel entropy coding concept, oint Collaborative Team on Video Coding (JCT-VC) of ITU-T SG16 WP3 and ISO/IEC JTC1/SC29/WG11, 1st Meeting: Dresden, DE, Apr. 15-23, 2010 (Year: 2010)—cited by Examiner in U.S. Appl. No. 16/417,785.

| PROB STATE | UNQUANTIZED rLPS VALUES | | | | QUANTIZED rLPS VALUES | | | | QUANTIZE | BITS PER ENTRY |
|---|---|---|---|---|---|---|---|---|---|---|
| 0 | 128 | 176 | 208 | 240 | 128 | 176 | 208 | 240 | 4LSB | 4 |
| 2 | 128 | 158 | 187 | 216 | 128 | 160 | 192 | 224 | 4LSB | 4 |
| 3 | 123 | 150 | 178 | 205 | 124 | 152 | 180 | 204 | 2LSB | 6 |
| 4 | 116 | 142 | 169 | 195 | 116 | 144 | 168 | 196 | 2LSB | 6 |
| 7 | 100 | 122 | 144 | 166 | 100 | 124 | 144 | 168 | 2LSB | 6 |
| 9 | 90 | 110 | 130 | 150 | 92 | 112 | 132 | 152 | 2LSB | 6 |
| 13 | 73 | 89 | 105 | 122 | 72 | 88 | 104 | 124 | 2LSB | 6 |
| 17 | 59 | 72 | 86 | 99 | 60 | 72 | 88 | 100 | 2LSB | 6 |
| 21 | 48 | 59 | 69 | 80 | 48 | 60 | 68 | 80 | 2LSB | 6 |
| 34 | 24 | 30 | 35 | 41 | 24 | 30 | 35 | 41 | 2MSB | 6 |
| 48 | 12 | 14 | 17 | 20 | 12 | 14 | 17 | 20 | 3MSB | 5 |
| 61 | 6 | 7 | 9 | 10 | 6 | 7 | 9 | 10 | 4MSB | 4 |

*FIG. 2*

SIMPLIFIED BINARY ARITHMETIC CODING ENGINE

CROSS-REFERENCE TO RELATED APPLICATIONS

This application is a continuation of U.S. patent application Ser. No. 17/137,465, filed Dec. 30, 2020, and scheduled to grant as U.S. Pat. No. 11,722,682, which is a continuation of U.S. patent application Ser. No. 16/417,785, filed May 21, 2019 (now U.S. Pat. No. 10,911,764), which is a continuation of U.S. patent application Ser. No. 13/250,749, filed Sep. 30, 2011 (now U.S. Pat. No. 10,349,070), which claims benefit of U.S. Provisional Patent Application Ser. No. 61/388,523, filed Sep. 30, 2010, and U.S. Provisional Patent Application Ser. No. 61/390,072, filed Oct. 5, 2010, which are incorporated herein by reference in their entirety.

BACKGROUND OF THE INVENTION

Field of the Invention

Embodiments of the present invention generally relate to a simplified binary arithmetic coding engine for probability interval partitioning in video coding.

Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

Entropy coding is a known bottleneck in a video encoder/decoder. Since future video coding standards may support much higher video resolutions and frame rates than current standards, there is a need to increase concurrency in entropy coding to achieve higher throughput. As a result, there has been considerable research into improving the parallelism of the entropy coding engine. However, parallelism may require replication of various modules which results in increased hardware area cost. It is important to simplify the replicated modules to keep the area cost low.

SUMMARY

Embodiments of the present invention relate to methods and apparatus for entropy coding and decoding. In one aspect, a method of entropy coding in a video encoder includes assigning a first bin to a first single-probability bin encoder of a plurality of single-probability bin encoders based on a probability state of the first bin, wherein the first single-probability bin encoder performs binary arithmetic coding based on a first fixed probability state, assigning a second bin to a second single-probability bin encoder of the plurality of single-probability bin encoders based on a probability state of the second bin, wherein the second single-probability bin encoder performs binary arithmetic coding based on a second fixed probability state different from the first fixed probability state, and coding the first bin in the first single-probability bin encoder and the second bin in the second single-probability bin encoder in parallel, wherein the first single-probability bin encoder uses a first rLPS table consisting of rLPS values for the first fixed probability state and the second single-probability bin encoder uses a second rLPS table consisting of rLPS values for the second fixed probability state.

In one aspect, a method of entropy decoding in a video decoder includes assigning a first bin to a first single-probability bin decoder of a plurality of single-probability bin decoders based on a probability state of the first bin, wherein the first single-probability bin decoder performs binary arithmetic decoding based on a first fixed probability state, assigning a second bin to a second single-probability bin decoder of the plurality of single-probability bin decoders based on a probability state of the second bin, wherein the second single-probability bin decoder performs binary arithmetic decoding based on a second fixed probability state different from the first fixed probability state, and decoding the first bin in the first single-probability bin decoder and the second bin in the second single-probability bin decoder in parallel, wherein the first single-probability bin decoder uses a first rLPS table consisting of rLPS values for the first fixed probability state and the second single-probability bin decoder uses a second rLPS table consisting of rLPS values for the second fixed probability state.

In one aspect, an entropy encoding apparatus in a digital system includes a probability quantizer configured to map a bin to a probability state interval of a plurality of probability state intervals based on a probability of the bin, wherein one probability state in each probability state interval is a representative probability state for the probability state interval, and a multi-probability bin encoder comprising an rLPS table consisting of rLPS values for the representative probability states of the probability state intervals.

BRIEF DESCRIPTION OF THE DRAWINGS

Particular embodiments will now be described, by way of example only, and with reference to the accompanying drawings:

FIG. 2 is a table comparing unquantized and quantized rLPS values;

DETAILED DESCRIPTION OF EMBODIMENTS OF THE INVENTION

Figure 1A:
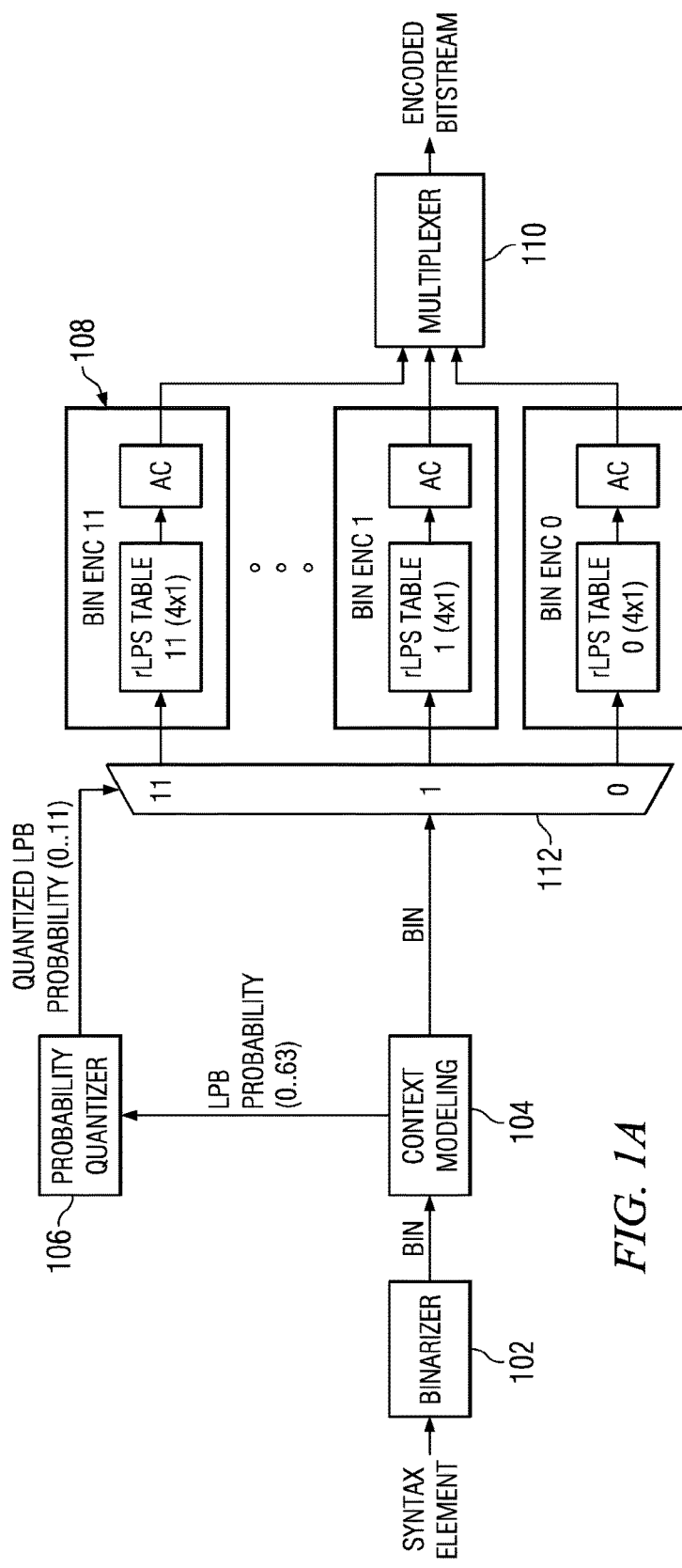
FIGS. 1A-1C are block diagrams of entropy coding systems.

Specific embodiments of the invention will now be described in detail with reference to the accompanying figures. Like elements in the various figures are denoted by like reference numerals for consistency.

For convenience of description, embodiments of the invention are described herein in reference to the October 2010 draft specification for the emerging next generation video coding standard currently under development by a Joint Collaborative Team on Video Coding (JCT-VC) established by the ISO/IEC Moving Picture Experts Group (MPEG) and ITU-T Video Coding Experts Group (VCEG). This emerging standard is commonly referred to as High Efficiency Video Coding (HEVC). The 2010 draft specification is entitled "WD1: Working Draft 1 of High-Efficiency Video Coding." One of ordinary skill in the art will understand that embodiments of the invention are not limited to this draft specification or to HEVC.

Some aspects of this disclosure have been presented to the JCT-VC in the following documents: JCTVC-C300, entitled "High-Efficiency Entropy Coding Simplification", Oct. 7-14, 2010, and JCTVC-D037, entitled "TE12: Evaluation of Entropy Coders: PIPE Tested Against CABAC", Oct. 7-14, 2010. Both documents are incorporated by reference herein in their entirety.

As used herein, the term "picture" refers to a frame or a field of a frame. A frame is a complete image captured during a known time interval. In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, 128×128, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be 4×4, 8×8, 16×16, 32×32 and 64×64. The sizes of the transform units and prediction units for a CU are determined by the video encoder during prediction based on minimization of rate/distortion costs.

Probability interval partitioning entropy coding (PIPE) is a known technique for parallel entropy coding. Further, PIPE has been proposed for HEVC and the proposed version has been implemented in the HEVC test model under consideration, version 0.7.3 (TMuC-0.7.3). PIPE is explained in detail in Detlev Marpe, et al., "Probability Interval Partitioning Entropy Codes," submitted to IEEE Transactions on Information Theory, June 2010, accessed Sep. 26, 2011 http://iphome.hhi.de/marpe/pub.htm ("Marpe-1"), and in Detlev Marpe, et al., "Novel Entropy Coding Concept," JCTVC-A032, April 15-23, 2010 ("Marpe-2"). Both of these documents are incorporated by reference herein. The PIPE implementation in the TMuC-0.7.3 is available at https://hevc.hhi.fraunhofer.de/svn/svn_HEVCSoftware/tags/0.7.3/.

In general, PIPE provides for entropy coding and decoding similar to that of the H.264/AVC context adaptive binary arithmetic coding (CABAC) framework with modifications to allow for parallel coding of binary symbols (bins). More specifically, in PIPE, binary symbols (bin) of different probabilities are processed in parallel. As in CABAC, syntax elements are mapped to bins and a context characterized by a probability and the value of the least probable bin (LPB) is selected for each bin. Also, as in CABAC, probability states are used for estimating the LPB probabilities. In the HEVC proposal and the TMuC-0.7.3 implementation, the number of probability states used is the same as that of CABAC, i.e., 64. The LPB probabilities are mapped to some number of probability intervals and a separate bin encoder (decoder) is operated for each probability interval. In the HEVC proposal and the TMuC-0.7.3 implementation, 12 probability intervals are defined, and thus 12 different bin encoders (decoders) are used. Each bin encoder (decoder) operates at a fixed LPB probability representative of the probabilities in the particular probability interval. The outputs of the bin encoders (decoders) are multiplexed to generate the final output.

The bin encoders (decoders) in PIPE may be binary arithmetic coding (BAC) engines or variable length codes to variable length codes (V2V) coding engines. The V2V option is not relevant to this disclosure and is thus not described herein. A BAC engine is similar to the arithmetic coding engine used in H.264/AVC CABAC. Accordingly, one of the key steps in a BAC engine is to multiply the probability with the range. In the TMuC-0.7.3 PIPE implementation, similar to this multiplication is implemented with a 64×4 table of predetermined 8-bit values representing the product of a probability and a range, commonly referred to as an rLPS table where r is range and LPS is least probable symbol. That is, given a 2-bit representation of the range and a 6-bit representation of the probability state, one of 256 8-bit rLPS values can be selected. Thus, each BAC bin encoder includes a 64×4 rLPS table, i.e., the H.264/AVC CABAC rLPS table.

If the PIPE approach is implemented in hardware, a separate bin encoder (decoder) is needed for each of the probability intervals. For the HEVC proposed version, there would be 12 encoders (decoders). Further, if the bin encoders (decoders) are BAC engines, each requires a 64×4 rLPS table. A significant portion of the area, i.e., an estimated 50%, for each BAC bin encoder would be consumed by the rLPS table.

Embodiments of the invention provide a simplified BAC engine in which the size of the rLPS table of each of the bin encoders (decoders) is reduced from 64×4 to 1×4. The inventors observed that the probability state for each of proposed PIPE BAC bin encoders is fixed. Because the probability state for each BAC bin encoder (decoder) is known, there is no need store 64 6-bit probability states in a 64×4 rLPS table for each bin encoder (decoder). Accordingly, the rLPS table for a simplified BAC bin encoder (decoder), i.e., a single-probability bin encoder, includes only the 4 8-bit rLPS values for the particular probability state of the bin encoder (decoder), i.e., a 1×4 rLPS table. This table size reduction results in a significant reduction in the area needed for a hardware implementation as compared to the BAC engines proposed for HEVC.

FIG. 1A is a block diagram of a PIPE system in which the bin encoders are simplified BAC engines. A high level description of the PIPE system is provided herein. More detailed explanation may be found in Marpe-1 and Marpe-2. The PIPE system includes a binarizer 102, a context modeler 104, a probability quantizer 106, multiple single-probability bin encoders 108, and a multiplexer 110.

If a syntax element is not a binary syntax element, the syntax element is binarized by the binarizer 102, i.e., the syntax element is mapped onto a sequence of binary symbols, i.e., bins. A context is then selected for each bin by the context modeler 104. A context is essentially a (binary) probability model for a class of bins that is characterized by the probability and the value of the less probable bin (LPB). The LPB probability is represented by one of 64 probability states. The binarization performed by the binarizer 102 and the context modeling performed by the context modeler 104 is basically the same as that of the context adaptive binary arithmetic coding (CABAC) framework of H.264/AVC. The theory and operation of CABAC encoding for H.264/AVC is fully defined in the International Telecommunication Union, Telecommunication Standardization Sector (ITU-T) standard "Advanced Video Coding for Generic Audiovisual Services," H.264, revision March 2005 or later. General principles are explained in detail in Detlev Marpe, et al., "Context-Based Adaptive Binary Arithmetic Coding in the H.264/AVC Video Compression Standard," IEEE Transactions on Circuits and Systems for Video Technology, Vol 13, No. 7, July 2003.

The estimated LPB probabilities from the context modeler 104 are then quantized by the probability quantizer 106. That is, the 64 probability states of a context are mapped to 12 probability intervals. A probability interval is a range of consecutive probability values that can covered by the probability states that are mapped to the interval. All probability states that are mapped to the same probability interval will give the same rLPS value, i.e., all probability states in the interval will result in the range being divided using the same ratio. One of the probability states in each probability state intervals is used as the representative probability state for the interval.

The probability quantizer 106 maps each LPB probability state to one of the 12 probability state intervals, and outputs a quantized LPB probability, i.e., the representative probability state of the selected probability state interval. Each of the single-probability bin encoders 108 operates on bins in one of the probability state intervals. Further, each single-probability bin encoder operates on a fixed LPB probability state, which is the representative probability state for the corresponding LPB probability state interval. In the proposed HEVC PIPE implementation, the 12 fixed LPB probability states are 0, 2, 3, 4, 7, 9, 13, 17, 21, 34, 48, and 61. The bin encoder mapping may be implemented using a look-up table (LUT), e.g., a 64×1 LUT, which associates each of the 64 state indices for the LPB probabilities with a single-probability bin encoder. The output of the 64×1 LUT is used to control the demultiplexer 112, which determines where a bin is sent by selecting one of 12 outputs each connected to different single-probability bin encoders.

The single-probability bin encoders 108 are simplified BAC engines that each include an rLPS table and an arithmetic encoder (AC). The rLPS table in each single-probability bin encoder includes only the 4 8-bit rLPS values for the particular fixed probability state of the bin encoder, i.e., a 1×4 rLPS table. For example, if the fixed probability state of single-probability bin encoder 0 is probability state 0, rLPS table 0 stores the four 8-bit rLPS values for probability state 0 from the H.264/AVC CABAC rLPS table. The arithmetic encoder in each single-probability bin encoder performs binary arithmetic encoding based on the particular fixed probability state of the single-probability bin encoder and the 1×4 rLPS table.

Each of the single-probability bin encoders 108 generates a partial bitstream of codewords. The multiplexer 110 combines these partial bitstreams into a single bitstream.

For HEVC, a header for each of the partial bitstreams is also included in the multiplexed output bitstream. The header information for the twelve bitstreams can be a significant percentage of the bits of a network access layer (NAL) unit, especially for small NAL units. Further, for small NAL units, the use of parallel entropy coding and decoding is not really needed.

To address this issue, the HEVC proposal includes adaptively switching between the parallel coding with twelve BAC bin encoders, and coding with a single arithmetic coding engine with variable LPB probabilities as defined in H.264/AVC CABAC based on a threshold. For example, if the expected size of a NAL unit or a slice is less than 12000 bytes, the single arithmetic coding engine would be used; otherwise, the parallel BAC bin encoders would be used.

Further, the TMuC-0.7.3 PIPE implementation of this single arithmetic coding engine includes the full 64×4 rLPS table.

Figure 1C:
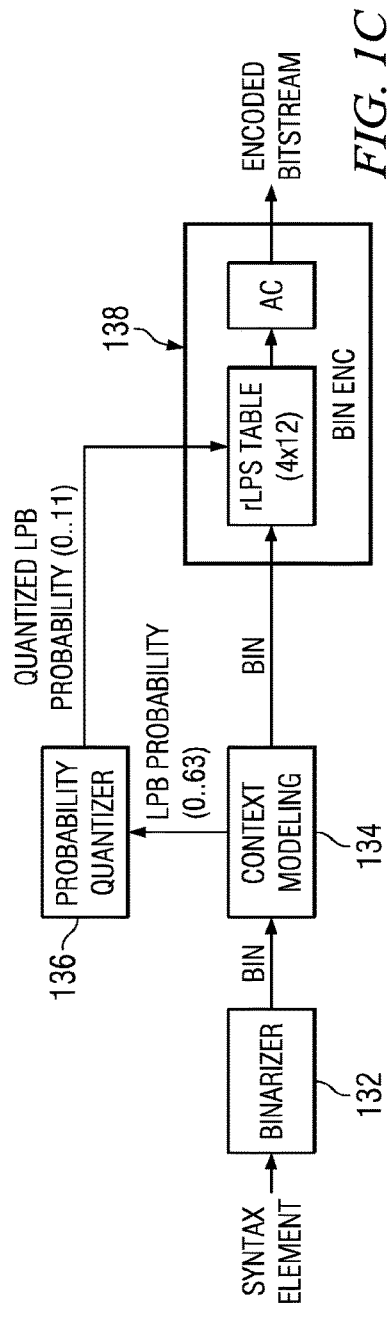
Figure 1B:
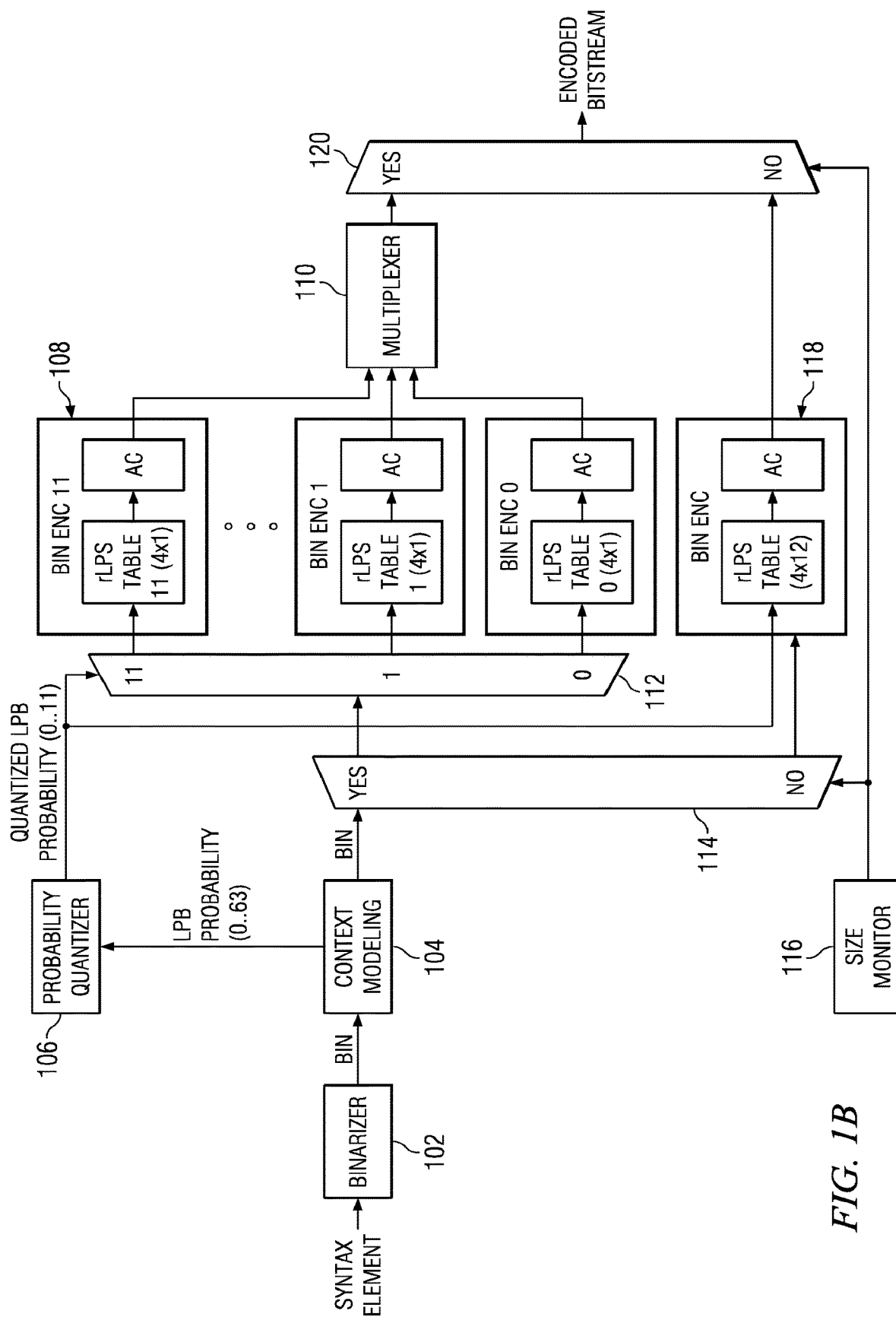

FIG. 1B is a block diagram extending the PIPE system of FIG. 1 to include adaptively switching between parallel bin encoding and multi-probability bin encoding. The binarizer 102, the context modeler 104, the probability quantizer 106, the multiple single-probability bin encoders 108, the demultiplexer 112, and the multiplexer 110 operate as previously described. Additional functionality in the form of a demultiplexer 114, a size monitor 116, a multi-probability bin encoder 118, and a demultiplexer 120 is added.

The size monitor 116 determines whether to switch from parallel single probability arithmetic coding to multi-probability arithmetic coding based on a comparison between the number of encoded bits in the output unit, e.g., a slice, and a threshold value. The value of the threshold may be predetermined and/or user specified. The size monitor 116 may estimate the number of bits in the output unit, for example, from the number of coefficients or some property of the syntax elements. If the number of bits in the output unit is larger than the threshold, parallel single-probability arithmetic coding is to be used and the demultiplexer 114 assigns the bin to the parallel coding component composed of the demutiplexer 112, the single-probability bin encoders 108, and the multiplexer 110. Otherwise, the bin is assigned to the single multi-probability bin encoder 118.

The multi-probability bin encoder 118 includes a 4×12 rLPS table and a multi-probability arithmetic coder (AC). The 4×12 rLPS table contains the 4 8-bit rLPS values for each of the 12 fixed probability states of the 12 probability intervals used by the probability quantizer 106. In other words, the 4×12 rLPS table replicates the rLPS values of the 12 4×1 rLPS tables of the single-probability bin encoders 108. Note that in an implementation, it may be possible to share the 12 1×4 rLPS tables between the single-probability bin encoders and the multi-probability bin encoder. The multi-probability arithmetic coder in the multi-probability bin encoder 118 performs multi-probability binary arithmetic encoding using the 4×12 rLPS table. That is, based on the quantized probability state from the probability quantizer 106 and a current range, the multi-probability arithmetic coder will perform a table lookup in the 4×12 rLPS table to retrieve the appropriate rLPS value.

The multiplexer 120 selects the output of the multiplexer 110 or the multi-probability bin encoder 118 to be added to the encoded bitstream based on the coding mode selected by the size monitor 116.

In the system of FIG. 1B, rather than estimating the number of bits in an output unit, the entropy coding may be performed with the parallel single-probability bin encoders 108 and the actual size (without the headers) of the output determined. Re-encoding with the multi-probability bin encoder 118 is then performed if the threshold is not exceeded. Alternatively, the entropy coding may be performed with the multi-probability bin encoder 118 and the actual size of the output determined. Re-encoding with the parallel single-probability bin encoders 108 is then performed if the threshold is exceeded. In the previously mentioned approaches, the output unit is either entirely encoded using the parallel single-probability bin encoders or with the multi-probability bin encoder. Alternatively, entropy encoding may be performed with the multi-probability bin encoder 118, and once the threshold is exceeded, entropy coding is switched to using the parallel single-probability bin encoders 108. In this approach, the first part of an output unit may be encoded with the multi-probability bin encoder 118 and the second part encoded with the parallel single-probability bin encoders 108.

FIG. 1C is a block diagram of an entropy coding system in which a multi-probability bin encoder is used. The binarizer 132 and the context modeler 134 operate as previously described in reference to the binarizer 102 and the context modeler 104 of FIG. 1A. The operation of the probability quantizer 136 is similar to that of the probability quantizer 106 of FIG. 1A except that the bin encoder mapping is not performed. Instead, the quantized probability states are provided to the multi-probability bin encoder 138. The multi-probability bin encoder 138 includes a 4×12 rLPS table and a multi-probability arithmetic coder (AC). The 4×12 rLPS table is previously described herein. The operation of the multi-probability bin encoder 138 is similar to that of the previously described multi-probability bin encoder 118 of FIG. 1B.

Figure 1D:
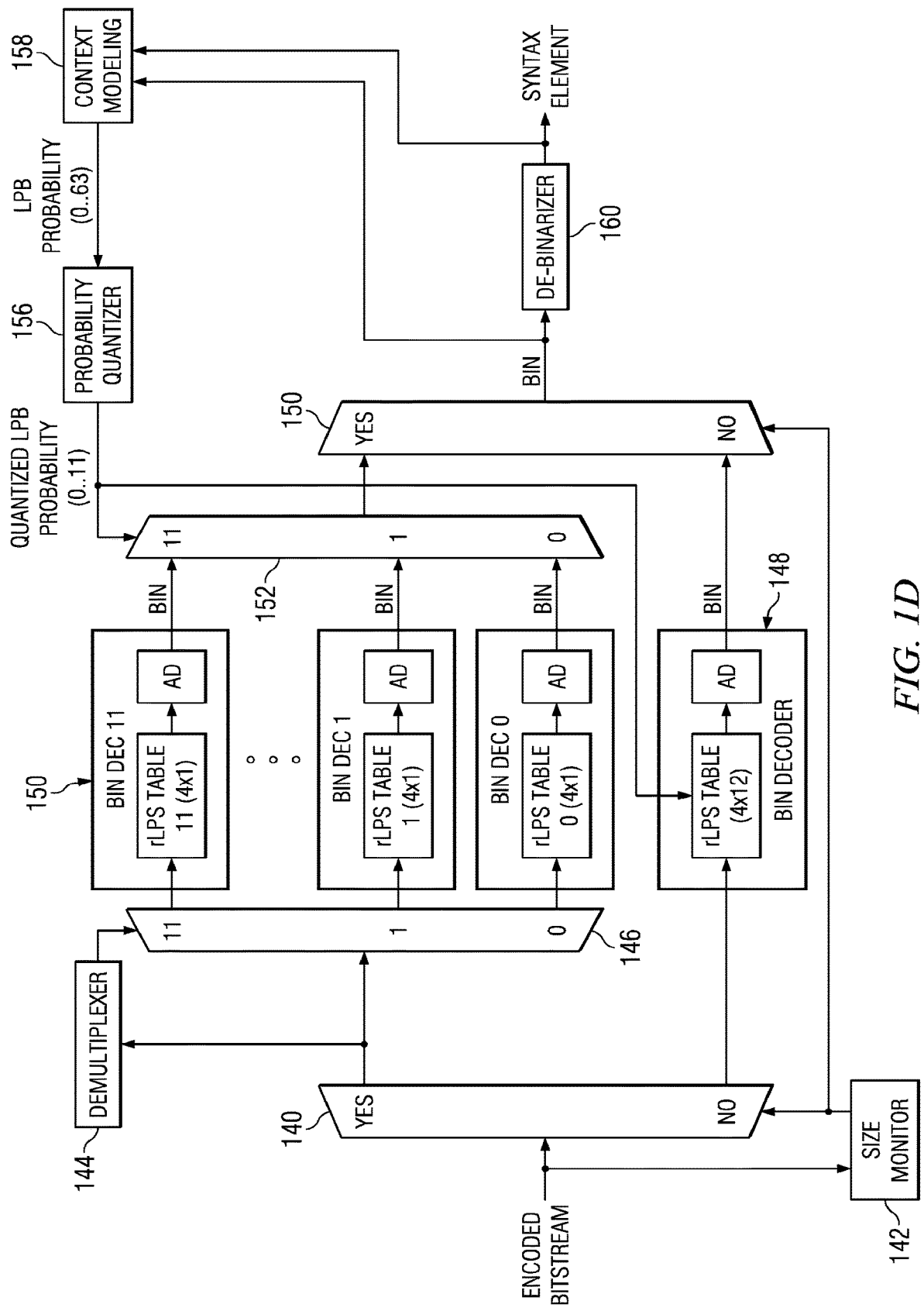
FIG. 1D is a block diagram of an entropy decoding system.

FIG. 1D is a block diagram of an entropy decoding system configured to reverse the entropy coding of the entropy coding system of FIG. 1B. The entropy decoding system includes a demultiplexer 140, a size monitor 142, a multi-probability bin decoder 148, a bitstream demultiplexer 144, a demultiplexer 146, multiple single-probability bin decoders 150, multiplexers 150, 152, a de-binarizer 160, context modeling 158, and a probability quantizer 156.

The size monitor 142 monitors the encoded bitstream to determine whether multi-probability decoding or parallel single probability decoding should be used and provides an indication of the choice of decoding mode to the demultiplexer 140. The demultiplexer 140 directs the encoded bitstream to the bitstream demultiplexer 144 or the multi-probability bin decoder 148 based on the indicated decoding mode. The bitstream demultiplexer 144 operates to reverse the operation of the bitstream multiplexer 110 of the entropy encoder. That is, the bitstream demultiplexer 144 splits those portions of the encoded bitstream that are the twelve multiplexed partial bitstreams back into the twelve individual partial bitstreams.

The single-probability bin decoders 150 are simplified BAD engines that each include an rLPS table and an arithmetic decoder (AD). The rLPS table in each single-probability bin decoder includes only the 4 8-bit rLPS values for the particular fixed probability state of the single-probability bin decoder, i.e., a 1×4 rLPS table. The 1×4 rLPS tables are identical to those in the single-probability bin encoders 108. Each of the single-probability bin decoders 150 operates to reverse the encoding of one of the single-probability bin encoders 108. The arithmetic decoder in each single-probability bin decoder performs binary arithmetic decoding based on the particular fixed probability state of the bin decoder and the 1×4 rLPS table.

The demultiplexer 146 provides each partial bitstream to the appropriate single-probability bin decoder 150, i.e., to the single-probability bin decoder corresponding to the single-probability bin encoder that generated the partial bitstream. The demultiplexer 152 selects the output of one of the single-probability bin decoders 150 based on the probability state determined by the probability quantizer 156. The demultiplexer 150 selects the output of the demultiplexer 152 or the multi-probability bin decoder 148 based on the coding mode selected by the size monitor 142.

The multi-probability bin decoder 148 operates to reverse the encoding of the multi-probability bin encoder 118. The multi-probability bin decoder 148 includes a 4×12 rLPS table identical to that in the multi-probability bin encoder 118 and a multi-probability arithmetic decoder (AD). The multi-probability arithmetic decoder performs multi-probability binary arithmetic decoding using the 4×12 rLPS table. Based on the quantized probability state from the probability quantizer 156 and a current range, the multi-probability arithmetic decoder will perform a table lookup in the 4×12 rLPS table to retrieve the appropriate rLPS value.

The de-binarizer 160 operates to reverse the binarization of the binarizer 102 to reconstruct syntax elements. The context modeler 158 determines the context for the next bin, and the probability quantizer 156 quantizes the LPB probabilities of the contexts to map an LPB probability to one of the twelve probability intervals.

The size of the rLPS table in a single-probability bin encoder or decoder may be further reduced by quantizing the rLPS values. As was previously mentioned, each entry of the 64×4 rLPS table is 8-bits. This entry size is due to the bit accuracy of the range (2-bits) and the probability (6-bits). In the PIPE system of FIG. 1, the probability quantizer 106 reduces the resolution of a probability from 6 bits to $LOG_2$ 12~=4 bits before sending the probability to a single-probability bin encoder. Thus, the number of bits used to represent an rLPS value can be reduced by at least 2 bits, e.g., from 8 bits to 6 bits, by removing 2 or more of the least significant bits or most significant bits. In general, the number of bits used to represent an rLPS value can be reduced by at least the bit resolution reduction of the probability quantizer. The choice of which bits to remove depends on the actual rLPS value. The larger probability states tend to have smaller rLPS values so the least significant bits of the rLPS values are more important than for the smaller probability states with larger rLPS values. Additional quantization can be applied for some larger rLPS values as removing additional bits will not result in significant coding loss. For example, the rLPS values of the smaller probability states tend to be large enough that removing 1 or 2 addition bits from the least significant bits has a small impact on coding efficiency. In general, the amount of additional quantization used is a tradeoff between number of bits used and impact on coding efficiency.

Further size reduction can be achieved for certain probabilities because the dynamic range of the rLPS values of some probabilities is quite low. For example, for probability state 61, the rLPS table values of {6, 7, 9, 10} require only 4 bits to represent the values. Thus, the number of bits to represent these values can be reduced from 8 to 4 by removing the four most significant bits. In general, the number of bits used to represent each of the rLPS values for some probability values can be further reduced to the minimum number of bits required to store the highest rLPS value for the probability state. The above quantization options may also be used to reduce the size of the 4×12 rLPS table used by the multi-probability bin encoders of FIG. 1B and FIG. 1C and the multi-probability bin decoder of FIG. 1D.

As was previously mentioned, the 64×4 rLPS tables in the proposed HEVC PIPE implementation duplicate the 64×4 rLPS table from H.264/AVC CABAC. FIG. 2 shows a table comparing the unquantized rLPS values for the selected twelve fixed probability states with the quantized rLPS values. The quantized rLPS values that differ from the unquantized values are shaded. The "Quantize" column indicates the particular quantization strategy used. For example, 4LSB indicates that the four least significant bits of the original rLPS value were removed and 2MSB indicates that the two most significant bits of the original rLPS value were removed. The "Bits per entry" column indicates the bit size of the quantized values. Thus, quantizing the rLPS values reduces the total storage size for the 12 1×4 rLPS tables for 12 bin encoders implemented as simplified BAC engines and the total from 12*4*8=384 bits to 4*(3*4+5+8*6)=284 bits (a 26% reduction). This quantization also similarly reduces the total storage size for the 4×12 rLPS table.

Figure 3:
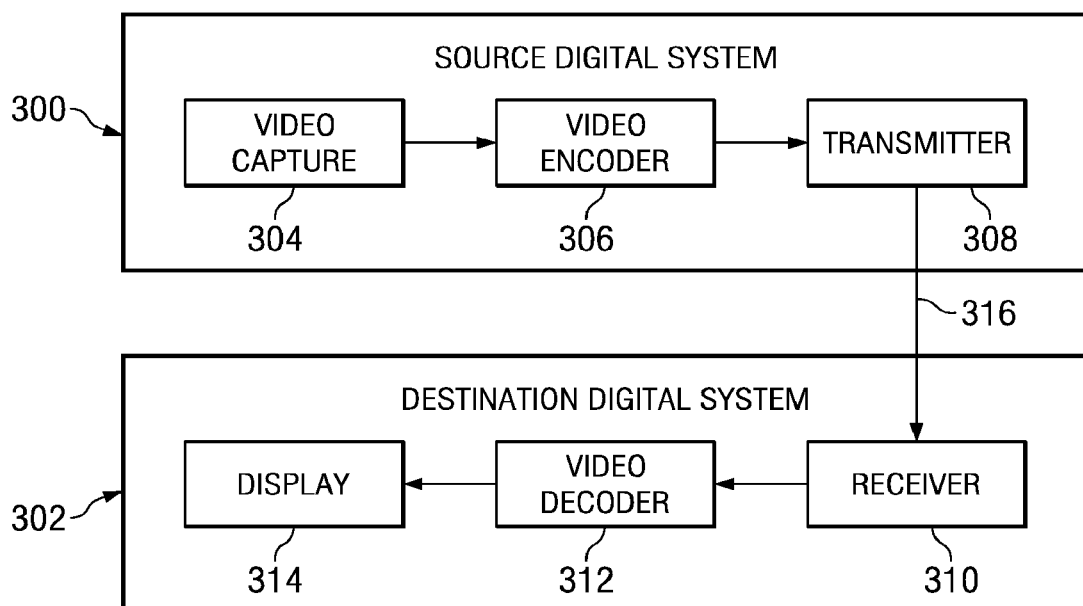
FIG. 3 is a block diagram of a digital system.

FIG. 3 shows a block diagram of a digital system that includes a source digital system 300 that transmits encoded video sequences to a destination digital system 302 via a communication channel 316. The source digital system 300 includes a video capture component 304, a video encoder component 306, and a transmitter component 308. The video capture component 304 is configured to provide a video sequence to be encoded by the video encoder component 306. The video capture component 304 may be, for example, a video camera, a video archive, or a video feed from a video content provider. In some embodiments, the video capture component 304 may generate computer graphics as the video sequence, or a combination of live video, archived video, and/or computer-generated video.

The video encoder component 306 receives a video sequence from the video capture component 304 and encodes it for transmission by the transmitter component 308. The video encoder component 306 receives the video sequence from the video capture component 304 as a sequence of frames, divides the frames into largest coding units (LCUs), and encodes the video data in the LCUs. The video encoder component 306 may be configured to apply entropy coding techniques during the encoding process as described herein. Embodiments of the video encoder component 306 are described in more detail herein in reference to FIGS. 4A and 4B.

The transmitter component 308 transmits the encoded video data to the destination digital system 302 via the communication channel 316. The communication channel 316 may be any communication medium, or combination of communication media suitable for transmission of the encoded video sequence, such as, for example, wired or wireless communication media, a local area network, or a wide area network.

The destination digital system 302 includes a receiver component 310, a video decoder component 312 and a display component 314. The receiver component 310 receives the encoded video data from the source digital system 300 via the communication channel 316 and provides the encoded video data to the video decoder component 312 for decoding. The video decoder component 312 reverses the encoding process performed by the video encoder component 306 to reconstruct the LCUs of the video sequence. The video decoder component 312 may be configured to apply entropy decoding techniques during the decoding process as described herein. Embodiments of the video decoder component 312 are described in more detail below in reference to FIG. 5.

The reconstructed video sequence is displayed on the display component 314. The display component 314 may be any suitable display device such as, for example, a plasma display, a liquid crystal display (LCD), a light emitting diode (LED) display, etc.

In some embodiments, the source digital system 300 may also include a receiver component and a video decoder component and/or the destination digital system 302 may include a transmitter component and a video encoder component for transmission of video sequences both directions for video steaming, video broadcasting, and video telephony. Further, the video encoder component 306 and the video decoder component 312 may perform encoding and decoding in accordance with one or more video compression standards. The video encoder component 306 and the video decoder component 312 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 4A:
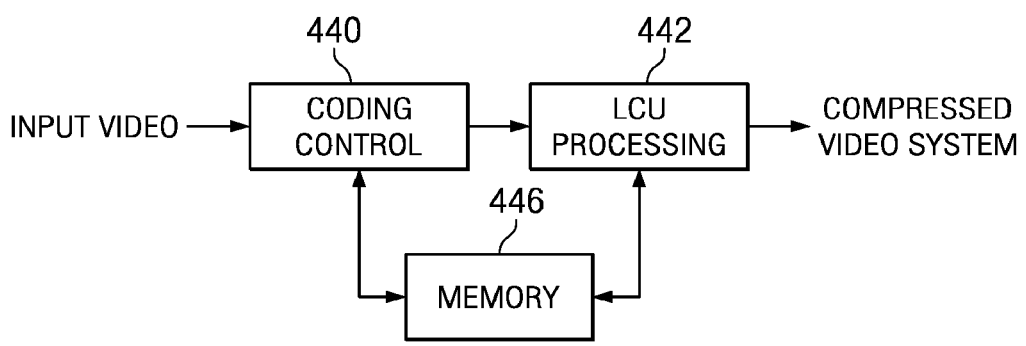
FIGS. 4A and 4B are block diagrams of a video encoder.
Figure 4B:
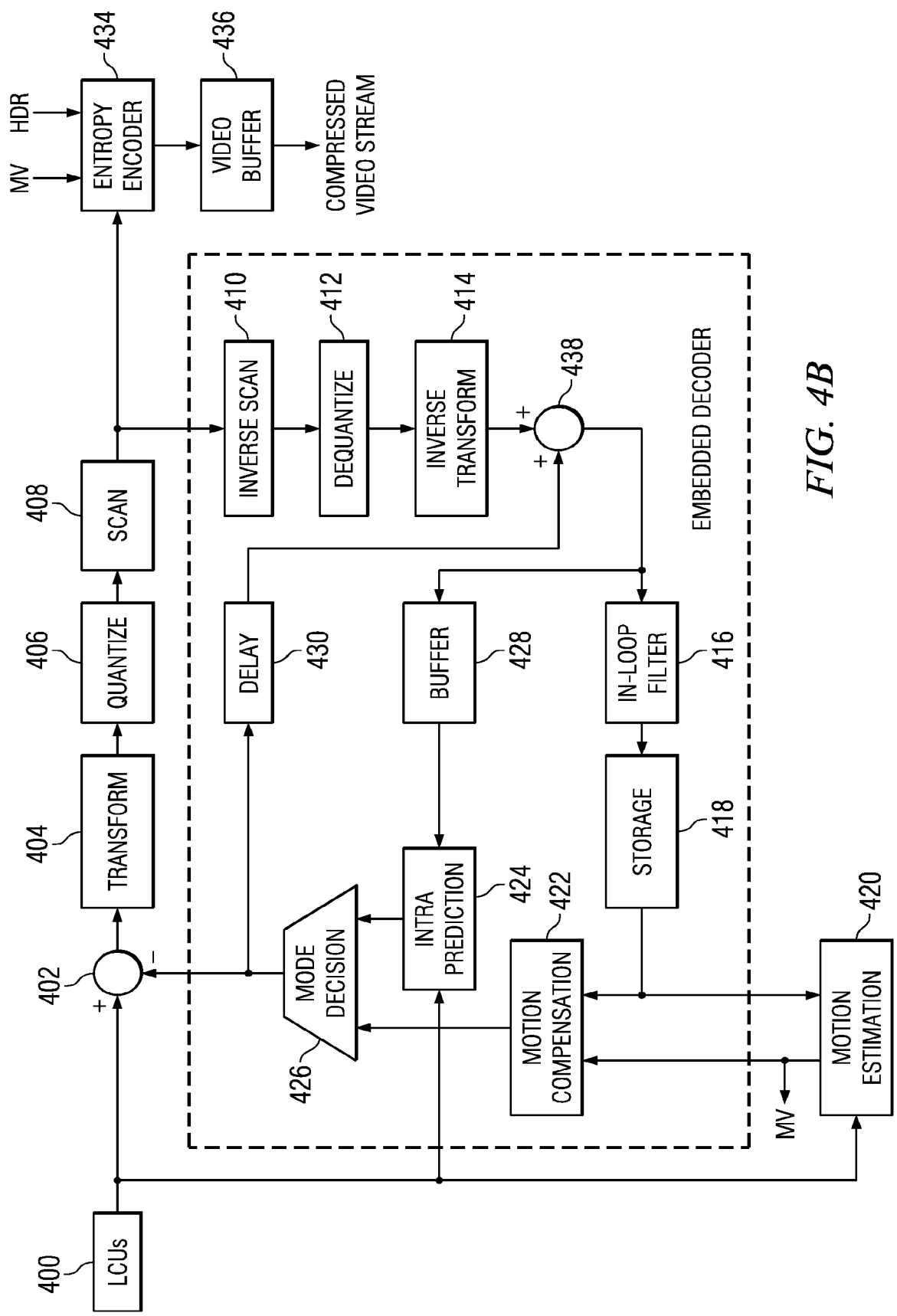

FIGS. 4A and 4B show block diagrams of a video encoder. FIG. 4A shows a high level block diagram of the video encoder and FIG. 4B shows a block diagram of the LCU processing component 442 of the video encoder. As shown in FIG. 4A, a video encoder includes a coding control component 440, an LCU processing component 442, and a memory 446. The memory 446 may be internal memory, external memory, or a combination thereof. An input digital video sequence is provided to the coding control component 440. The coding control component 440 sequences the various operations of the video encoder. For example, the coding control component 440 performs any processing on the input video sequence that is to be done at the frame level, such as determining the coding type (I, P, or B) of a picture based on the high level coding structure, e.g., IPPP, IBBP, hierarchical-B, and dividing a frame into LCUs for further processing.

The coding control component 440 also may determine the initial LCU CU structure for each CU and provides information regarding this initial LCU CU structure to the various components of the LCU processing component 442 as needed. The coding control component 440 also includes rate control functionality that determines the quantization parameter(s) for the CUs.

The LCU processing component 442 receives LCUs of the input video sequence from the coding control component 440 and encodes the LCUs to generate the compressed video stream. The CUs in the CU structure of an LCU may be processed by the LCU processing component 442 in a depth-first Z-scan order.

FIG. 4B shows the basic coding architecture of the LCU processing component 442. The LCUs 400 from the coding control unit 440 are provided as one input of a motion estimation component 420, as one input of an intra prediction component 424, and to a positive input of a combiner 402 (e.g., adder or subtractor or the like). Further, although not specifically shown, the prediction mode of each picture as selected by the coding control component 440 is provided to a mode selector component, and the entropy encoder 434.

The storage component 418 provides reference data to the motion estimation component 420 and to the motion compensation component 422. The reference data may include one or more previously encoded and decoded CUs, i.e., reconstructed CUs.

The motion estimation component 420 provides motion estimation information to the motion compensation component 422 and the entropy encoder 434. More specifically, the motion estimation component 420 performs tests on CUs in an LCU based on multiple temporal prediction modes and transform block sizes using reference data from storage 418 to choose the best motion vector(s)/prediction mode based on a coding cost. To perform the tests, the motion estimation component 420 may begin with the CU structure provided by the coding control component 440. The motion estimation component 420 may divide each CU indicated in the CU structure into prediction units according to the unit sizes of prediction modes and into transform units according to the transform block sizes and calculate the coding costs for each prediction mode and transform block size for each CU.

For coding efficiency, the motion estimation component 420 may also decide to alter the CU structure by further partitioning one or more of the CUs in the CU structure. That is, when choosing the best motion vectors/prediction modes, in addition to testing with the initial CU structure, the motion estimation component 420 may also choose to divide the larger CUs in the initial CU structure into smaller CUs (within the limits of the recursive quadtree structure), and calculate coding costs at lower levels in the coding hierarchy. If the motion estimation component 420 changes the initial CU structure, the modified CU structure is communicated to other components in the LCU processing component 442 that need the information.

The motion estimation component 420 provides the selected motion vector (MV) or vectors and the selected prediction mode for each inter predicted CU to the motion compensation component 423 and the selected motion vector (MV) to the entropy encoder 434. The motion compensation component 422 provides motion compensated inter prediction information to the mode decision component 426 that includes motion compensated inter predicted CUs, the selected temporal prediction modes for the inter predicted CUs, and corresponding transform block sizes. The coding costs of the inter predicted CUs are also provided to the mode decision component 426.

The intra prediction component 424 provides intra prediction information to the mode decision component 426 that includes intra predicted CUs and the corresponding spatial prediction modes. That is, the intra prediction component 424 performs spatial prediction in which tests based on multiple spatial prediction modes and transform unit sizes are performed on CUs in an LCU using previously encoded neighboring CUs of the picture from the buffer 428 to choose the best spatial prediction mode for generating an intra predicted CU based on a coding cost. To perform the tests, the intra prediction component 424 may begin with the CU structure provided by the coding control component 440. The intra prediction component 424 may divide each CU indicated in the CU structure into prediction units according to the unit sizes of the spatial prediction modes and into transform units according to the transform block sizes and calculate the coding costs for each prediction mode and transform block size for each CU.

For coding efficiency, the intra prediction component 424 may also decide to alter the CU structure by further partitioning one or more of the CUs in the CU structure. That is, when choosing the best prediction modes, in addition to testing with the initial CU structure, the intra prediction component 424 may also chose to divide the larger CUs in the initial CU structure into smaller CUs (within the limits of the recursive quadtree structure), and calculate coding costs at lower levels in the coding hierarchy. If the intra prediction component 424 changes the initial CU structure, the modified CU structure is communicated to other components in the LCU processing component 442 that need the information. Further, the coding costs of the intra predicted CUs and the associated transform block sizes are also provided to the mode decision component 426.

The mode decision component 426 selects between the motion-compensated inter predicted CUs from the motion compensation component 422 and the intra predicted CUs from the intra prediction component 424 based on the coding costs of the CUs and the picture prediction mode provided by the mode selector component. The output of the mode decision component 426, i.e., the predicted CU, is provided to a negative input of the combiner 402 and to a delay component 430. The associated transform block size is also provided to the transform component 404. The output of the delay component 430 is provided to another combiner (i.e., an adder) 438. The combiner 402 subtracts the predicted CU from the current CU to provide a residual CU to the transform component 404. The resulting residual CU is a set of pixel difference values that quantify differences between pixel values of the original CU and the predicted CU.

The transform component 404 performs block transforms on the residual CUs to convert the residual pixel values to transform coefficients and provides the transform coefficients to a quantize component 406. The transform component 404 receives the transform block sizes for the residual CUs and applies transforms of the specified sizes to the CUs to generate transform coefficients.

The quantize component 406 quantizes the transform coefficients based on quantization parameters (QPs) provided by the coding control component 440 and the transform sizes. The quantized transform coefficients are taken out of their scan ordering by a scan component 408 and arranged by significance, such as, for example, beginning with the more significant coefficients followed by the less significant.

The ordered quantized transform coefficients for a CU provided via the scan component 408 along with header information for the CU are coded by the entropy encoder 434, which provides a compressed bit stream to a video buffer 436 for transmission or storage. The header information may include an indicator of the transform block size used for the CU and the quantization parameter for the CU. The entropy encoder 434 also codes the CU structure of each LCU. The entropy encoder 434 may be configured to apply entropy encoding techniques as described herein.

Inside the LCU processing component 442 is an embedded decoder. As any compliant decoder is expected to reconstruct an image from a compressed bitstream, the embedded decoder provides the same utility to the video encoder. Knowledge of the reconstructed input allows the video encoder to transmit the appropriate residual energy to compose subsequent frames. To determine the reconstructed input, i.e., reference data, the ordered quantized transform coefficients for a CU provided via the scan component 408 are returned to their original post-transform arrangement by an inverse scan component 410, the output of which is provided to a dequantize component 412, which outputs a reconstructed version of the transform result from the transform component 404.

The dequantized transform coefficients are provided to the inverse transform component 414, which outputs estimated residual information which represents a reconstructed version of a residual CU. The inverse transform component 414 receives the transform block size used to generate the transform coefficients and applies inverse transform(s) of the specified size to the transform coefficients to reconstruct the residual values.

The reconstructed residual CU is provided to the combiner 438. The combiner 438 adds the delayed selected CU to the reconstructed residual CU to generate an unfiltered reconstructed CU, which becomes part of reconstructed picture information. The reconstructed picture information is provided via a buffer 428 to the intra prediction component 424 and to a filter component 416. The filter component 416 is an in-loop filter which filters the reconstructed frame information and provides filtered reconstructed CUs, i.e., reference data, to the storage component 418.

Figure 5:
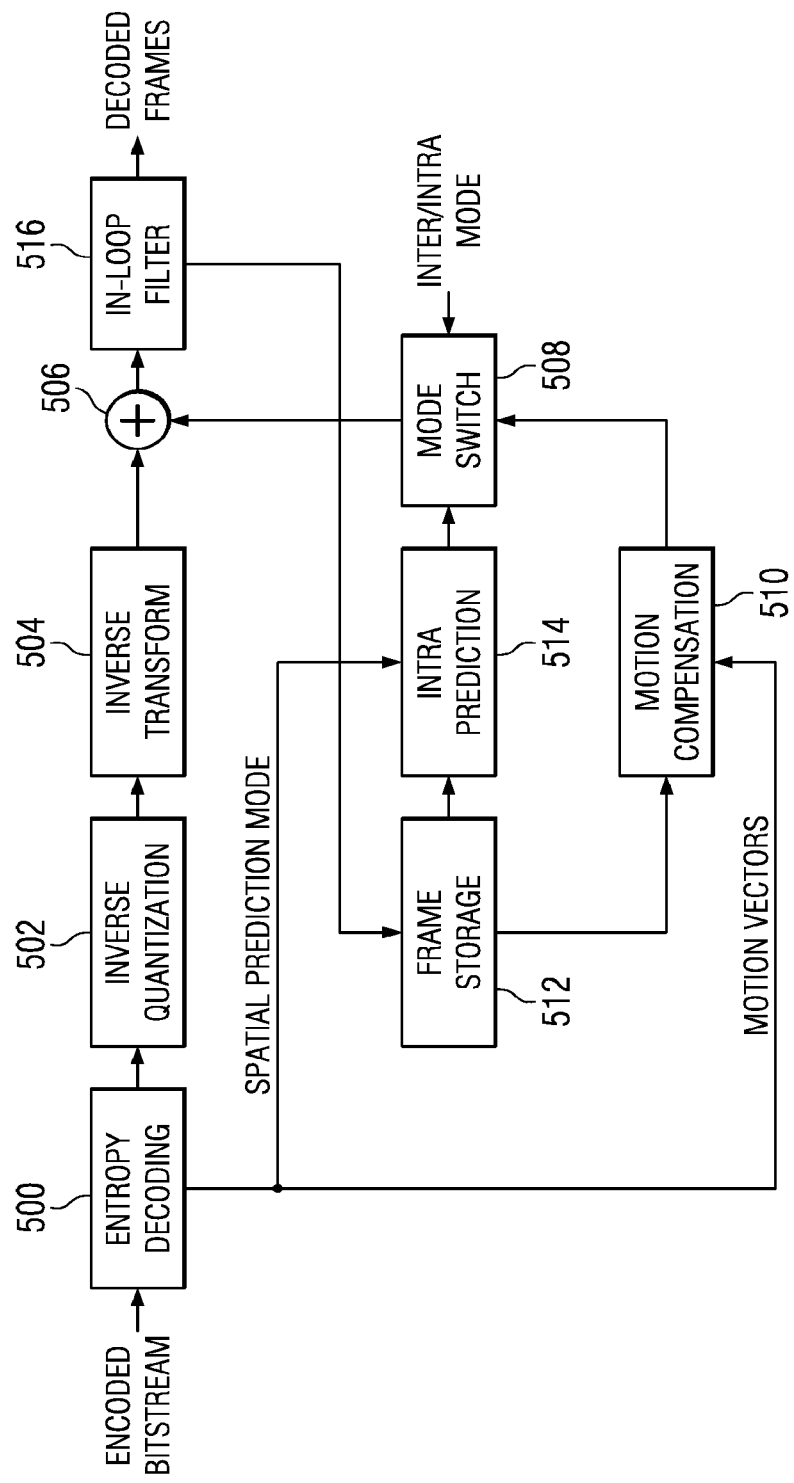
FIG. 5 is a block diagram of a video decoder.

FIG. 5 shows a block diagram of a video decoder. The video decoder operates to reverse the encoding operations, i.e., entropy coding, quantization, transformation, and prediction, performed by the video encoder of FIGS. 4A and 4B to regenerate the frames of the original video sequence. In view of the above description of a video encoder, one of ordinary skill in the art will understand the functionality of components of the video decoder without detailed explanation.

The entropy decoding component 500 receives an entropy encoded video bit stream and reverses the entropy coding to recover the encoded CUs and header information such as the quantization parameters, the transform block sizes, and the encoded CU structures of the LCUs. The entropy decoding component 500 may be configured to apply entropy decoding techniques that reverse the entropy encoding techniques as described herein. The inverse quantization component 502 de-quantizes the quantized transform coefficients of the residual CUs. The inverse transform component 504 transforms the frequency domain data from the inverse quantization component 502 back to residual CUs. That is, the inverse transform component 504 applies an inverse unit transform, i.e., the inverse of the unit transform used for encoding, to the de-quantized residual coefficients to produce the residual CUs.

A residual CU supplies one input of the addition component 506. The other input of the addition component 506 comes from the mode switch 508. When inter-prediction mode is signaled in the encoded video stream, the mode switch 508 selects a prediction unit from the motion compensation component 510 and when intra-prediction is signaled, the mode switch selects a prediction unit from the intra prediction component 514. The motion compensation component 510 receives reference data from storage 512 and applies the motion compensation computed by the encoder and transmitted in the encoded video bit stream to the reference data to generate a predicted CU. The intra-prediction component 514 receives previously decoded predicted CUs from the current picture and applies the intra-prediction computed by the encoder as signaled by a spatial prediction mode transmitted in the encoded video bit stream to the previously decoded predicted CUs to generate a predicted CU.

The addition component 506 generates a decoded CU, by adding the selected predicted CU and the residual CU. The output of the addition component 506 supplies the input of the in-loop filter component 516. The in-loop filter component 516 smoothes artifacts created by the block nature of the encoding process to improve the visual quality of the decoded frame. The output of the in-loop filter component 516 is the decoded frames of the video bit stream. Each decoded CU is stored in storage 512 to be used as reference data.

Figure 6:
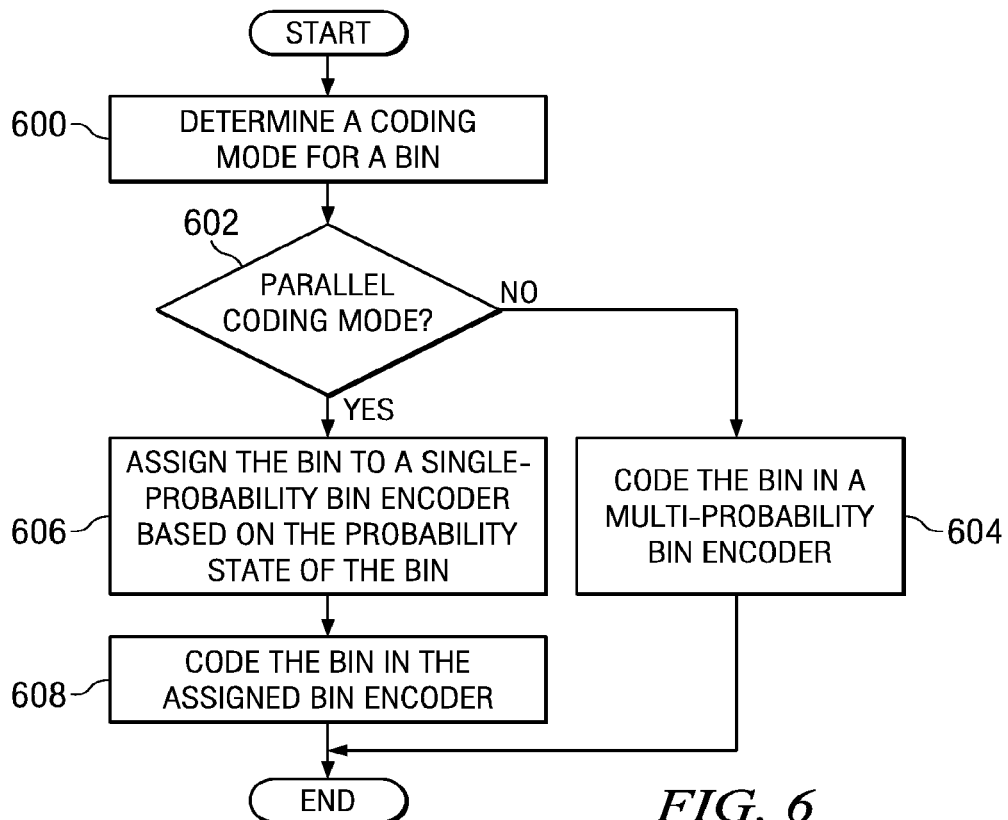
FIGS. 6 and 7 are flow diagrams of methods.

FIG. 6 is a flow diagram of a method for entropy coding in a video encoder. Initially, a coding mode for a bin is determined, i.e., whether the bin is to be coded in a parallel bin coding module with multiple single-probability bin encoders or is to be coded in a multi-probability bin encoder 600. This decision may be made as previously described herein. If parallel coding mode is selected 602, the bin is encoded in the parallel bin coding module. As previously described herein, a parallel bin coding module includes multiple single-probability bin encoders that operate in parallel, each of which performs binary arithmetic bin encoding using an rLPS table with only the rLPS values for one particular fixed probability state. The bin is assigned to one of the single-probability bin encoders based on the probability state of the bin 606. More specifically, as previously described herein, the fixed probability state of a single-probability bin encoder is a representative probability state for a defined probability state interval. The probability interval which includes the probability state of the bin is determined and the bin is assigned to the single-probability bin encoder corresponding to that probability interval. The bin is then coded by the assigned single-probability bin encoder 608. Coding of a bin in a single-probability bin encoder is previously described herein.

If parallel coding mode is not selected 602, the bin is encoded in the multi-probability bin encoder 604. As previously described herein, the multi-probability bin encoder performs multi-probability binary arithmetic encoding according to the fixed probability states of the single-probability bin encoders. That is, the rLPS table used by the multi-probability bin encoder includes only the rLPS values for the fixed probability states of the single-probability bin encoders.

Figure 7:
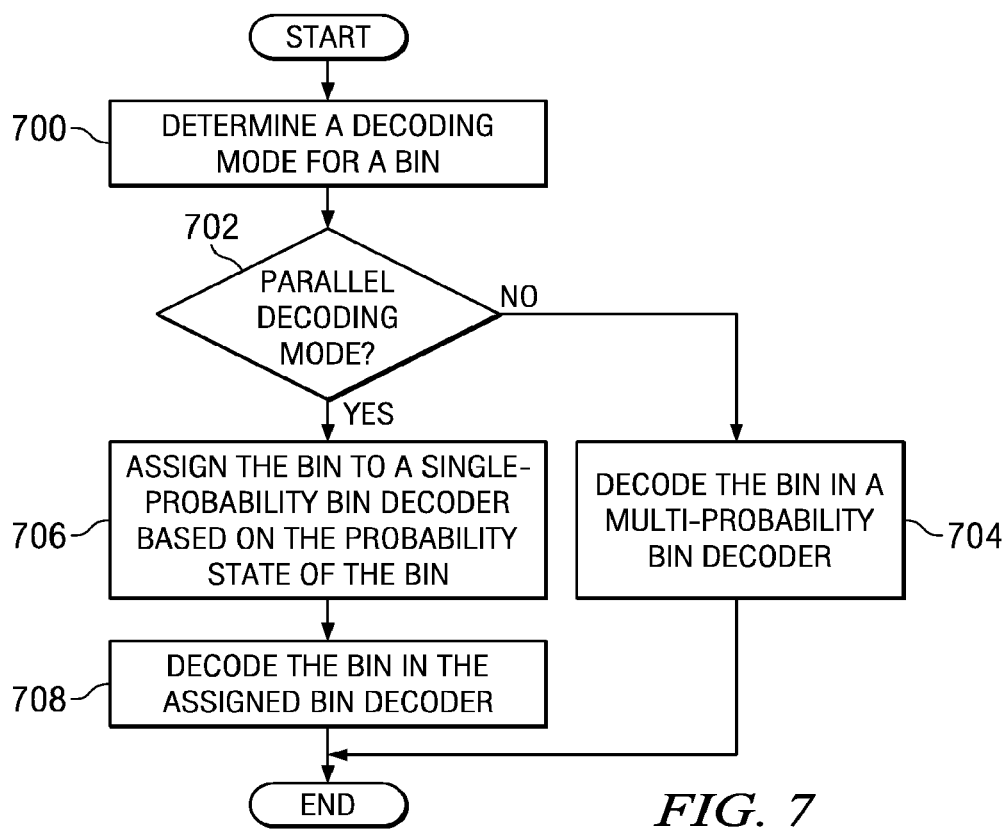

FIG. 7 is a flow diagram of a method for entropy decoding in a video decoder. Initially, a decoding mode for a bin is determined, i.e., whether the bin is to be decoded in a parallel bin decoding module with multiple single-probability bin decoders or is to be decoded in a multi-probability bin decoder 700. This decision may be made as previously described herein. If parallel decoding mode is selected 702, the bin is decoded in the parallel bin coding module. As previously described herein, a parallel bin decoding module includes multiple single-probability bin decoders that operate in parallel, each of which performs binary arithmetic bin decoding using an rLPS table with only the rLPS values for one particular fixed probability state. The bin is assigned to one of the single-probability bin decoders based on the probability state of the bin 706. More specifically, as previously described herein, the fixed probability state of a single-probability bin decoder is a representative probability state for a defined probability state interval. The probability interval which includes the probability state of the bin is determined and the bin is assigned to the single-probability bin decoder corresponding to that probability interval. The bin is then decoded by the assigned single-probability bin decoder 708. Decoding of a bin in a single-probability bin decoder is previously described herein.

If parallel decoding mode is not selected 702, the bin is decoded in the multi-probability bin decoder 704. As previously described herein, the multi-probability bin decoder performs multi-probability binary arithmetic decoding according to the fixed probability states of the single-probability bin decoders. That is, the rLPS table used by the multi-probability bin decoder includes only the rLPS values for the fixed probability states of the single-probability bin decoders.

Figure 8:
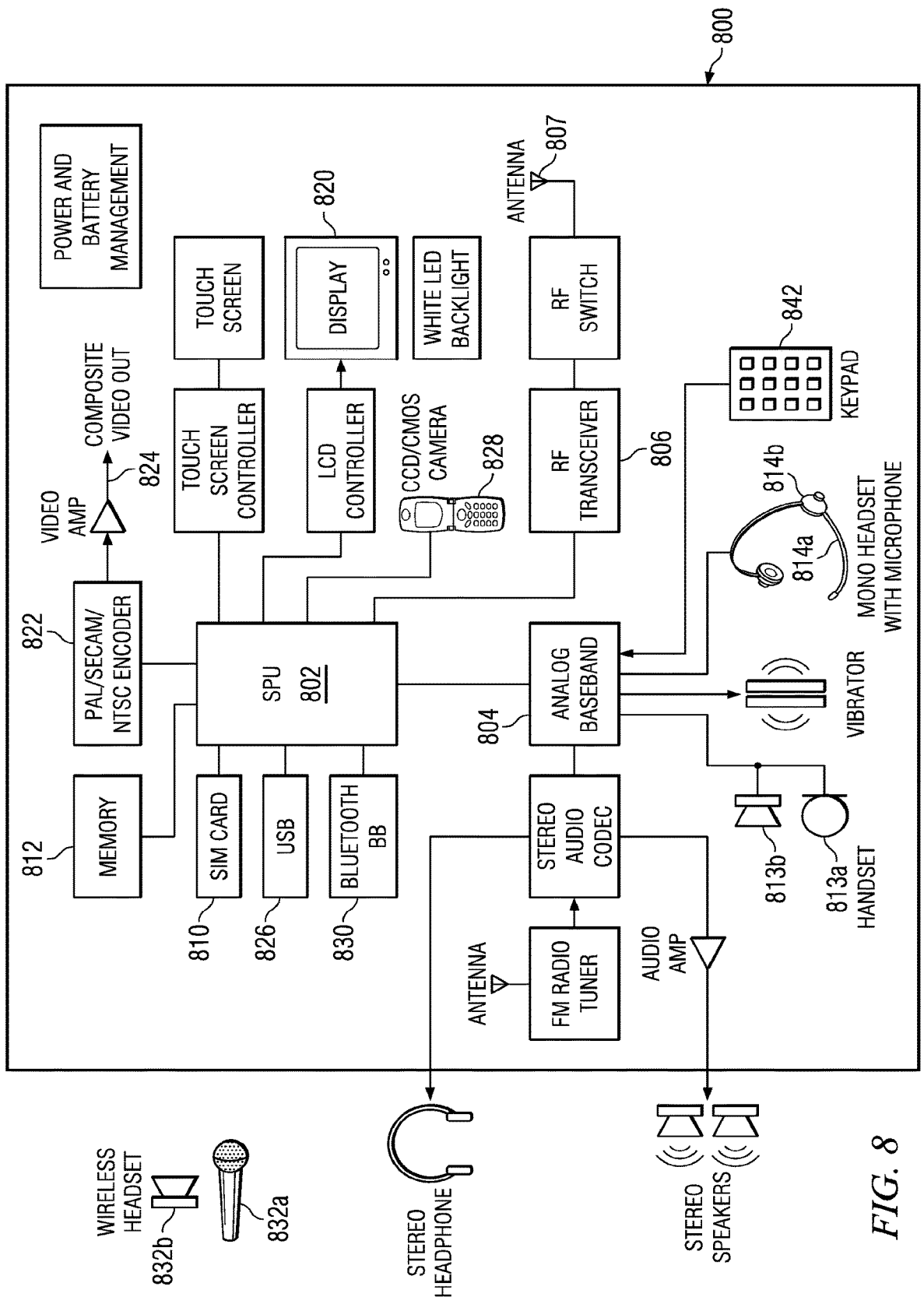
FIG. 8 is a block diagram of an illustrative digital system.

Embodiments of the methods, encoders, and decoders described herein may be implemented for virtually any type of digital system (e.g., a desk top computer, a laptop computer, a handheld device such as a mobile (i.e., cellular) phone, a personal digital assistant, a digital camera, etc.). FIG. 8 is a block diagram of a digital system (e.g., a mobile cellular telephone) 800 that may be configured to use techniques described herein.

As shown in FIG. 8, the signal processing unit (SPU) 802 includes a digital signal processing system (DSP) that includes embedded memory and security features. The analog baseband unit 804 receives a voice data stream from handset microphone 813*a* and sends a voice data stream to the handset mono speaker 813*b*. The analog baseband unit 804 also receives a voice data stream from the microphone 814*a* and sends a voice data stream to the mono headset 814*b*. The analog baseband unit 804 and the SPU 802 may be separate ICs. In many embodiments, the analog baseband unit 804 does not embed a programmable processor core, but performs processing based on configuration of audio paths, filters, gains, etc being setup by software running on the SPU 802.

The display 820 may display pictures and video sequences received from a local camera 828, or from other sources such as the USB 826 or the memory 812. The SPU 802 may also send a video sequence to the display 820 that is received from various sources such as the cellular network via the RF transceiver 806 or the Bluetooth interface 830. The SPU 802 may also send a video sequence to an external video display unit via the encoder unit 822 over a composite output terminal 824. The encoder unit 822 may provide encoding according to PAL/SECAM/NTSC video standards.

The SPU 802 includes functionality to perform the computational operations required for video encoding and decoding. In one or more embodiments, the SPU 802 is configured to perform computational operations for applying one or more techniques for entropy coding during the encoding process as described herein. Software instructions implementing all or part of the techniques may be stored in the memory 812 and executed by the SPU 802, for example, as part of encoding video sequences captured by the local camera 828. The SPU 802 is also configured to perform computational operations for applying one or more techniques for entropy decoding as described herein as part of decoding a received coded video sequence or decoding a coded video sequence stored in the memory 812. Software instructions implementing all or part of the techniques may be stored in the memory 812 and executed by the SPU 802.

Other Embodiments

While the invention has been described with respect to a limited number of embodiments, those skilled in the art, having benefit of this disclosure, will appreciate that other embodiments can be devised which do not depart from the scope of the invention as disclosed herein. For example, more or fewer probability states than the 64 probability states defined in H.264/AVC may be used. More or fewer ranges than the four ranges defined in H.264/AVC may be used. The number of probability intervals may be more or less than twelve, and the number of single-probability bin encoders and the size of the various rLPS tables increased or decreased accordingly. The choice of representative probability states may be different.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

The invention claimed is:

1. A system comprising:
    a first encoder configured to store a first range least probability symbol (rLPS) table including only four values for a first fixed probability interval, wherein the first encoder is configured to receive a first bin associated with the first fixed probability interval and output a first encoded bin; and
    a second encoder configured to store a second rLPS table different from the first rLPS table, wherein the second rLPS table includes only four values for a second fixed probability interval different from the first fixed probability interval, and wherein the second encoder is configured to receive a second bin associated with the second fixed probability interval and output a second encoded bin,
    wherein the system is configured to generate an encoded bitstream based on the first encoded bin and further based on the second encoded bin.

2. The system of claim 1,
    wherein the first rLPS table includes a first set of four rLPS values,
    wherein each rLPS value in the first set of four rLPS values includes fewer than eight bits,
    wherein the second rLPS table includes a second set of four rLPS values, and
    wherein each rLPS value in the second set of four rLPS values includes fewer than eight bits.

3. The system of claim 1, further comprising a third encoder, wherein the system is configured to:
    compare a number of encoded bits with a threshold value;
    in response to the number of encoded bits being greater than the threshold value, assign the first bin to the first encoder;
    in response to the number of encoded bits being greater than the threshold value, assign the second bin to the second encoder; and
    in response to the number of encoded bits being less than the threshold value, assign the first bin and the second bin to the third encoder.

4. The system of claim 3,
    wherein the first rLPS table includes a first set of rLPS values,
    wherein the second rLPS table includes a second set of rLPS values, and
    wherein the third encoder includes a third rLPS table including the first set of rLPS values and the second set of rLPS values.

5. The system of claim 3,
    wherein the first encoder is a first single probability encoder,
    wherein the second encoder is a second single probability encoder, and
    wherein the third encoder is a multi-probability encoder.

6. The system of claim 1, wherein the system is configured to:
    select a first context for the first bin;
    select a second context for the second bin;
    assign the first bin to the first encoder based on the first context; and
    assign the second bin to the second encoder based on the second context.

7. The system of claim 1, further comprising twelve encoders including the first encoder and the second encoder, wherein each encoder of the twelve encoders includes a respective rLPS table, wherein each encoder of the twelve encoders is configured to output a respective encoded bin, and wherein the system is configured to generate the encoded bitstream based on the encoded bins generated by the twelve encoders.

8. The system of claim 1, further comprising a binarizer configured to:

generate the first bin based on a syntax element; and generate the second bin based on the syntax element.

9. The system of claim 1, further comprising a multiplexer configured to generate the encoded bitstream by at least combining the first encoded bin and the second encoded bin.

10. The system of claim 1, further comprising a third encoder configured to store a third rLPS table including only four values for a third fixed probability interval different from the first and second fixed probability intervals, wherein the third encoder is configured to receive a third bin associated with the third fixed probability interval and output a third encoded bin.

11. A method comprising:

encoding, by a first encoder storing a first range least probability symbol (rLPS) table including only four values for a first fixed probability interval, a first bin to generate a first encoded bin, wherein the first bin is associated with the first fixed probability interval;

encoding, by a second encoder storing a second rLPS table different from the first rLPS table, a second bin to generate a second encoded bin, wherein the second rLPS table includes only four values for a second fixed probability interval different from the first fixed probability interval, and wherein the second bin is associated with the second fixed probability interval; and generating an encoded bitstream based on the first encoded bin and further based on the second encoded bin.

12. The method of claim 11, further comprising:

comparing a number of encoded bits with a threshold value;

in response to the number of encoded bits being greater than the threshold value, assigning the first bin to the first encoder, wherein the first encoder is a first single probability encoder;

in response to the number of encoded bits being greater than the threshold value, assigning the second bin to the second encoder, wherein the second encoder is a second single probability encoder; and in response to the number of encoded bits being less than the threshold value, assigning the first bin and the second bin to a multi-probability encoder.

13. The method of claim 11, wherein the first rLPS table includes a first set of rLPS values, wherein each rLPS value in the first set of four rLPS values includes fewer than eight bits, wherein the second rLPS table includes a second set of rLPS values, and wherein each rLPS value in the second set of four rLPS values includes fewer than eight bits.

14. A system comprising:

a first decoder configured to store a first range least probability symbol (rLPS) table including only four values for a first fixed probability interval, wherein the first decoder is configured to receive a first partial bitstream and output a first bin associated with the first fixed probability interval;

a second decoder configured to store a second rLPS table different from the first rLPS table, wherein the second rLPS table includes only four values for a second fixed probability interval different from the first fixed probability interval, and wherein the second decoder is configured to receive a second partial bitstream and output a second bin associated with the second fixed probability interval; and a de-binarizer configured to generate a syntax element based on the first bin and further based on the second bin.

15. The system of claim 14, wherein the first rLPS table includes a first set of four rLPS values, wherein each rLPS value in the first set of four rLPS values includes fewer than eight bits, wherein the second rLPS table includes a second set of four rLPS values, and wherein each rLPS value in the second set of four rLPS values includes fewer than eight bits.

16. The system of claim 14, further comprising a third decoder, wherein the system is configured to:

compare a number of encoded bits with a threshold value;

in response to the number of encoded bits being greater than the threshold value, assign the first bin to the first decoder;

in response to the number of encoded bits being greater than the threshold value, assign the second bin to the second decoder; and in response to the number of encoded bits being less than the threshold value, assign the first bin and the second bin to the third decoder.

17. The system of claim 16, wherein the first rLPS table includes a first set of rLPS values, wherein the second rLPS table includes a second set of rLPS values, and wherein the third decoder includes a third rLPS table including the first set of rLPS values and the second set of rLPS values.

18. The system of claim 16, wherein the first decoder is a first single probability decoder, wherein the second decoder is a second single probability decoder, and wherein the third decoder is a multi-probability decoder.

19. The system of claim 14, further comprising twelve decoders including the first decoder and the second decoder, wherein each decoder of the twelve decoders includes a respective rLPS table, wherein each decoder of the twelve decoders is configured to output a respective bin, and wherein the system is configured to generate the syntax element based on the bins generated by the twelve decoders.

20. The system of claim 14, further comprising a third decoder configured to store a third rLPS table including only four values for a third fixed probability interval different from the first and second fixed probability intervals, wherein the third decoder is configured to receive a third partial bitstream associated with the third fixed probability interval and output a third bin.

\* \* \* \* \*